(12) United States Patent
Okuno et al.

(10) Patent No.: US 11,388,377 B2
(45) Date of Patent: Jul. 12, 2022

(54) DISPLAY DEVICE AND PROJECTION DEVICE

(71) Applicant: Panasonic Intellectual Property Management Co., Ltd., Osaka (JP)

(72) Inventors: Manabu Okuno, Osaka (JP); Manabu Chikayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/132,713

(22) Filed: Dec. 23, 2020

(65) Prior Publication Data

US 2021/0203895 A1 Jul. 1, 2021

(30) Foreign Application Priority Data

Dec. 26, 2019 (JP) .............................. JP2019-236724

(51) Int. Cl.
*H04N 9/31* (2006.01)
*G02B 26/08* (2006.01)

(52) U.S. Cl.
CPC ....... *H04N 9/3158* (2013.01); *G02B 26/0833* (2013.01); *H04N 9/3152* (2013.01)

(58) Field of Classification Search
CPC .. H04N 9/3158; H04N 9/3152; H04N 9/3105; H04N 9/3144; H04N 9/3161; H04N 9/3167; G02B 26/0833; G02B 26/008; G02B 27/106; G02B 27/141; G02B 5/04; G02B 26/02; G02B 27/149; G03B 21/204; G03B 21/2066; G03B 21/2073;
(Continued)

(56) References Cited

U.S. PATENT DOCUMENTS 6,549,338 B1 * 4/2003 Wolverton ......... G02B 27/1026
359/634
2003/0048423 A1 * 3/2003 Aastuen ............... H04N 9/3105
353/31
(Continued)

FOREIGN PATENT DOCUMENTS

JP 2007-316208 12/2007
JP 2008-40335 2/2008
(Continued)

*Primary Examiner* — Michael Lee
(74) *Attorney, Agent, or Firm* — Wenderoth, Lind & Ponack L.L.P.

(57) ABSTRACT

The display device includes a light source unit that emits light, a first display element, and a second display element. The display device further includes a light separating and synthesizing member that separates the light emitted from the light source unit into first light and second light having different wavelength regions, emits the first light toward the first display element, emits the second light toward the second display element, and synthesizes the first light that has been reflected and modulated by the first display element and the second light that has been reflected and modulated by the second display element. The display device further includes a light absorbing member that covers a part of the first display element. The light absorbing member absorbs a part of the modulated second light reflected by the second display element and directed toward the first display element.

17 Claims, 7 Drawing Sheets

(58) Field of Classification Search
CPC ...... G03B 21/008; G03B 33/12; G03B 21/16;
G03B 33/06
USPC ........................................................ 348/744
See application file for complete search history.

(56) References Cited

U.S. PATENT DOCUMENTS

| | | | |
|---|---|---|---|
| 2006/0279846 A1* | 12/2006 | Ring .................... | G02B 27/145 |
| | | | 359/634 |
| 2008/0037095 A1 | 2/2008 | Sakina | |
| 2008/0094683 A1* | 4/2008 | Chen .................... | H04N 9/3105 |
| | | | 359/263 |
| 2009/0103053 A1* | 4/2009 | Ichikawa ............. | G03B 21/008 |
| | | | 353/33 |
| 2011/0199733 A1 | 8/2011 | Hirabayashi et al. | |
| 2016/0073100 A1* | 3/2016 | Huang .................. | H04N 13/363 |
| | | | 353/7 |
| 2017/0142378 A1 | 5/2017 | Terada | |
| 2020/0278597 A1* | 9/2020 | Masuda ............... | H04N 9/3105 |

FOREIGN PATENT DOCUMENTS

| | | | | |
|---|---|---|---|---|
| JP | 2011-169944 | | 9/2011 | |
| WO | 2015/194454 | | 12/2015 | |
| WO | WO-2019020198 A1 * | | 1/2019 | ........... G03B 21/008 |

\* cited by examiner

DISPLAY DEVICE AND PROJECTION DEVICE

BACKGROUND

1. Technical Field

The present disclosure relates to, for example, a display device and a projection device including the display device.

2. Description of the Related Art

WO 2015/194454 A discloses a display device and a projection device using a digital micromirror device (DMD) that is driven with respect to two orthogonal axes.

SUMMARY

A display element included in the display device generates image light by reflecting incident light according to an image signal. When a part of the generated image light enters another display element as stray light, a part of the stray light is reflected. However, the stray light that is not reflected heats the surrounding area of the display element and deteriorates display performance.

An object of the present disclosure is to provide a display device and a projection device that suppress an increase in temperature of a display element due to stray light emitted to the display element.

The display device according to the present disclosure includes: a light source unit that emits light; a first display element having a first optical modulator that modulates and reflects incident light; and a second display element having a second optical modulator that modulates and reflects incident light. The display device further includes a light separating and synthesizing member that separates the light emitted from the light source unit into first light and second light having different wavelength regions, emits the first light toward the first display element, emits the second light toward the second display element, and synthesizes the first light that has been reflected and modulated by the first display element and the second light that has been reflected and modulated by the second display element. The display device further includes a light absorbing member that covers a part of the first display element except for the first optical modulator. The light absorbing member absorbs a part of the modulated second light reflected by the second display element and directed toward the first display element.

The projection device according to the present disclosure includes the display device, and a projection lens unit that projects image light emitted from the display device.

According to the present disclosure, it is possible to provide a display device and a projection device that suppress an increase in temperature of a display element.

DETAILED DESCRIPTION

An exemplary embodiment will be described in detail below with reference to the drawings as appropriate. However, detailed descriptions more than necessary may be omitted. For example, a detailed description of a matter which is already well-known and a repeated description for a substantially identical configuration may be omitted. This is to avoid an unnecessarily redundant description below and to facilitate understanding of a person skilled in the art.

The inventor(s) of the present disclosure provides the appended drawings and the following description in order to allow those skilled in the art to fully understand the present disclosure, and does not intend to limit the subject matter described in the appended claims by the appended drawings and the following description.

EXEMPLARY EMBODIMENT

An exemplary embodiment will now be described with reference to FIGS. 1 to 10.

1-1. Configuration

[1-1-1. Overall Configuration]

Figure 1:
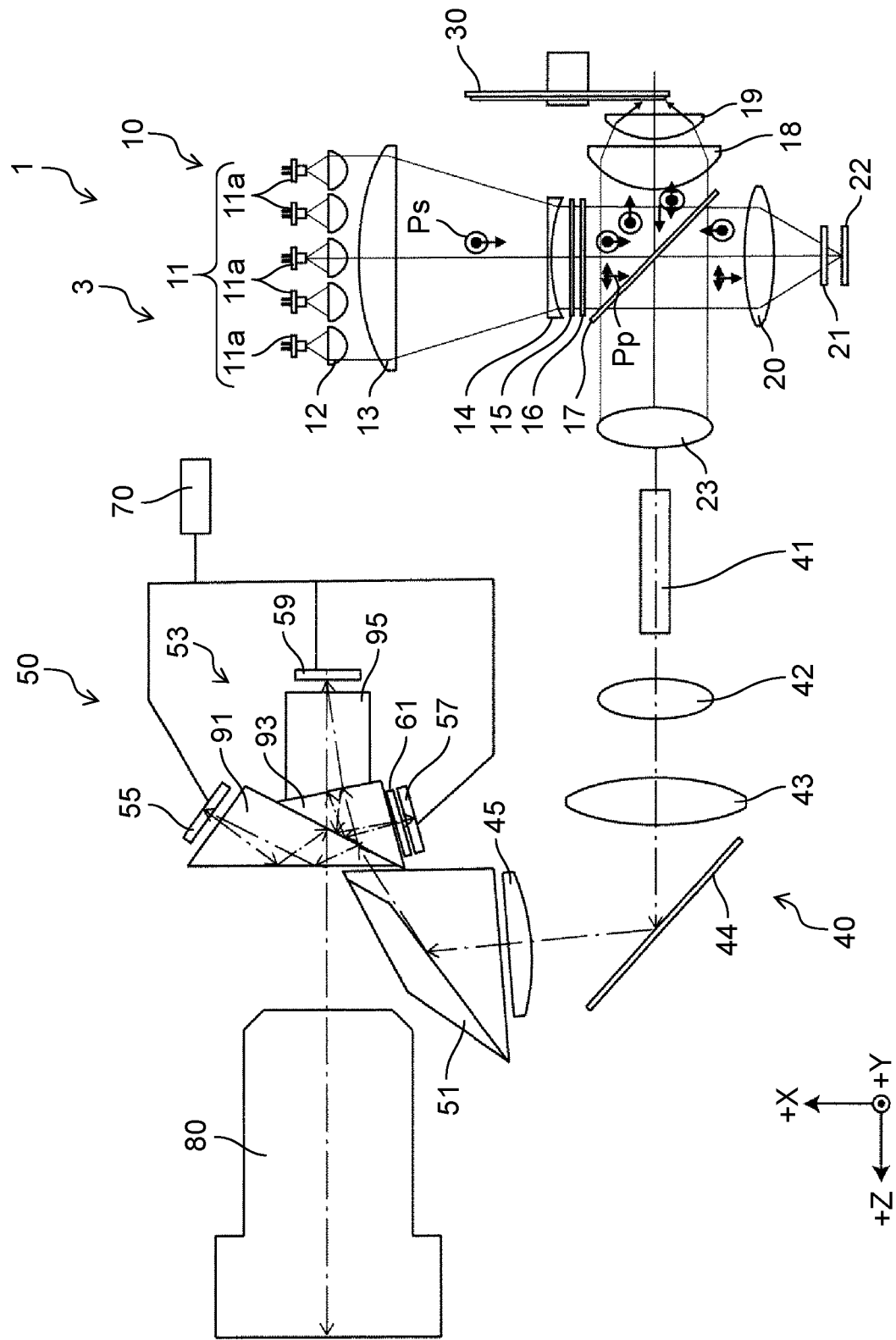
FIG. 1 is a diagram showing a configuration of a projection device including a display device according to an exemplary embodiment.
Figure 2:
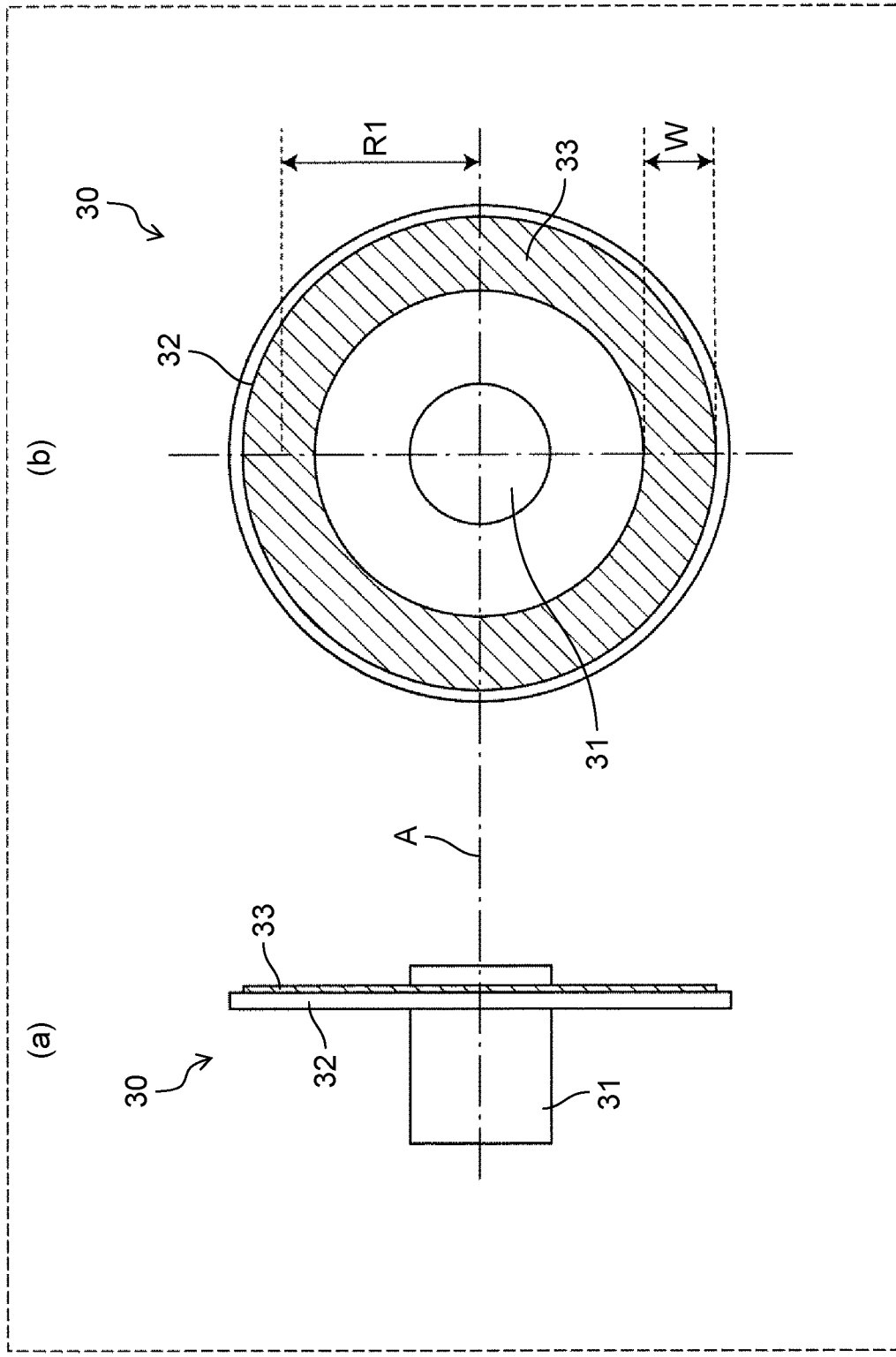
FIG. 2 is a diagram of a phosphor wheel used in the projection device according to the exemplary embodiment.

FIG. 1 is a diagram for describing a configuration of an optical system of projection device 1 equipped with display device 3 according to the present disclosure. For convenience of the following description, an XYZ orthogonal coordinate system, which is shown in FIG. 1, is adopted in FIG. 1.

Projection device 1 includes display device 3 and projection lens unit 80 that projects image light emitted from display device 3. Display device 3 includes light source unit 10 that emits white light, light guide unit 40 that guides the white light emitted from light source unit 10, display unit 50 that generates image light from the white light guided by light guide unit 40, and controller 70 that controls display unit 50.

First, light source unit 10 will be described. Laser light source 11 that is an excitation light source is, for example, a blue semiconductor laser that emits blue light with a wavelength region of 447 nm to 462 nm and radiates linearly polarized light. Laser light source 11 includes a plurality of semiconductor lasers in order to achieve high-luminance display unit 50. Laser light source 11 includes a plurality of blue semiconductor lasers 11a arranged on a plane in a matrix. FIG. 1 simply illustrates five blue semiconductor lasers 11a arranged side by side as an example. FIG. 1 shows, as an example, S-polarization Ps in which a polarization direction of blue semiconductor laser 11a is the Y-axis direction.

Laser light, which is excitation light emitted from each of laser light sources 11, is collimated by corresponding collimator lens 12. The light emitted from collimator lens 12 is substantially collimated. The entire light flux of the collimated light is converged by lens 13, and is again substantially collimated by lens 14.

The laser light flux substantially collimated by lens 14 passes through diffusion plate 15 and is applied to quarter wave plate 16 which is disposed to be rotated by a predetermined angle with respect to the X axis. The laser light is elliptically polarized by quarter wave plate 16 and enters dichroic mirror 17 disposed at approximately 45 degrees with respect to the optical axis.

Figure 3:
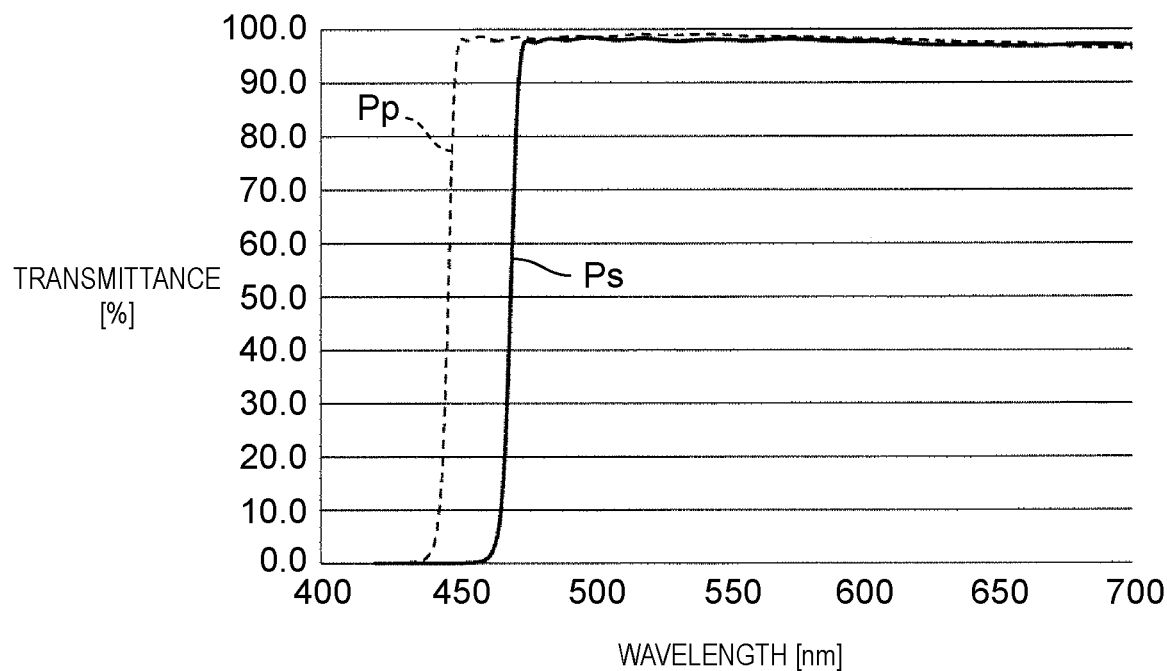
FIG. 3 is a graph showing a transmittance of a dichroic mirror used in the projection device according to the exemplary embodiment.

Diffusion plate 15 is a glass flat plate. Diffusion plate 15 has a diffusion surface with a microrelief structure on one surface. FIG. 3 shows the spectral transmittance of dichroic mirror 17. Wavelengths at which the transmittance of blue light is 50% are 465 nm for S-polarization Ps and 442 nm for P-polarization Pp. Colored light containing green and red components passes through dichroic mirror 17 with a transmittance of 96% or more.

An S-polarization Ps component of the laser light entering dichroic mirror 17 in the −X direction is reflected by dichroic mirror 17 and emitted in the −Z direction in FIG. 1. A P-polarization Pp component of the laser light passes through dichroic mirror 17 and is emitted in the −X direction in FIG. 1. The laser light emitted in the −Z direction is focused by lens 18 and lens 19, and excites a phosphor formed on phosphor wheel device 30.

As shown in the side view of FIG. 2A, phosphor wheel device 30 includes motor 31 and rotating member 32 that is formed of a disk-shaped plate and that is rotationally driven around a rotation axis of motor 31.

As shown in the front view of FIG. 2B, rotating member 32 has yellow phosphor 33 on a circumference distant from center A of the rotation axis of phosphor wheel device 30 by distance R1, yellow phosphor 33 extending with predetermined width W with the circumference as a center.

When laser light from laser light source 11 is focused on yellow phosphor 33 of phosphor wheel device 30, yellow phosphor 33 is excited and emits yellow light as fluorescence.

Returning to FIG. 1, yellow light obtained by phosphor wheel device 30 is emitted from phosphor wheel device 30 in the +Z direction. The fluorescence emitted from yellow phosphor 33 in the −Z direction is reflected by rotating member 32 and emitted in the +Z direction. These yellow light beams are collimated by lenses 19 and 18 and pass through dichroic mirror 17.

On the other hand, the P-polarization Pp component of the blue light of the blue semiconductor laser that has passed through dichroic mirror 17 is condensed by lens 20, passes through quarter wave plate 21, and becomes circularly polarized light. The circularly polarized blue light is reflected by reflection mirror 22 disposed near the focal point of lens 20, passes through quarter wave plate 21 again, and becomes light with S-polarization Ps. The blue light with S-polarization Ps is substantially collimated by lens 20 and is reflected by dichroic mirror 17.

In this way, yellow light from phosphor wheel device 30 and blue light reflected by reflection mirror 22 are synthesized by dichroic mirror 17 and emitted as white light. The emitted white light is condensed by condenser lens 23 and enters light guide unit 40.

Light guide unit 40 includes rod integrator 41, lenses 42 and 43, mirror 44, and lens 45. Light emitted from condenser lens 23 of light source unit 10 enters rod integrator 41.

The light emitted from rod integrator 41 enters display unit 50 through lens 42, lens 43, mirror 44, and lens 45.

Controller 70 controls the rotation of micromirrors of DMDs 55, 57, and 59 of display unit 50 according to image content. Controller 70 can be achieved by a semiconductor element or the like. Controller 70 can be achieved by, for example, a microcomputer, a central processing unit (CPU), a micro-processing unit (MPU), a graphics processing unit (GPU), a digital signal processor (DSP), a field-programmable gate array (FPGA), or an application specific integrated circuit (ASIC). The function of controller 70 can be achieved by hardware alone or may be achieved by a combination of hardware and software. Controller 70 has a storage unit such as a hard disk drive (HDD), a solid state drive (SSD), and a memory, and achieves a predetermined function by reading data and programs stored in the storage unit and performing various kinds of arithmetic processing.

Projection lens unit 80 includes a plurality of lenses that magnifies the image light emitted from display device 3. A conventional unit can be used as projection lens unit 80.

[1-1-2. Configuration of Main Parts]

Figure 4:
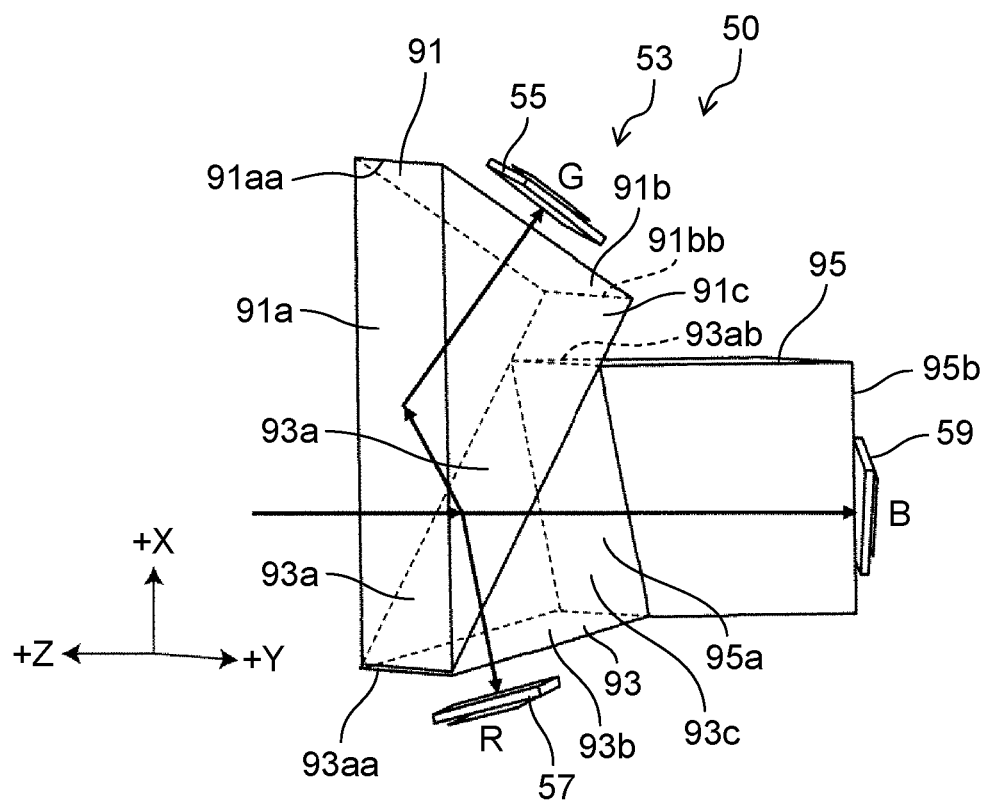
FIG. 4 is a perspective view of a light separating and synthesizing member used in the display device according to the exemplary embodiment.
Figure 5:
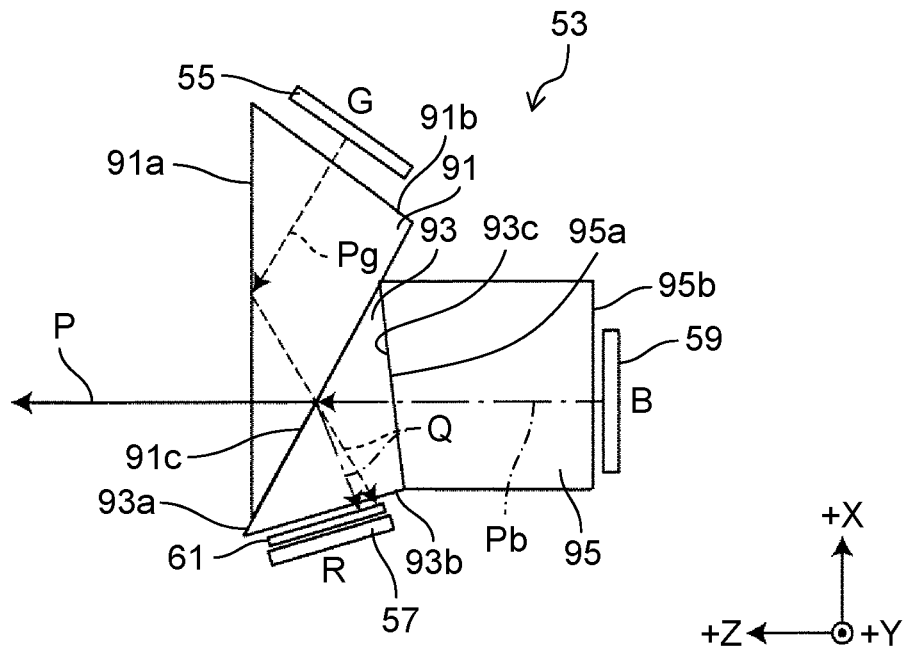
FIG. 5 is a side view of the light separating and synthesizing member used in the display device according to the exemplary embodiment.

Next, the configuration of display unit 50 will be described with reference to FIGS. 1, 4 and 5. FIG. 4 is a perspective view of light separating and synthesizing member 53 used in display unit 50 in the exemplary embodiment. FIG. 5 is a side view of light separating and synthesizing member 53 used in display unit 50. Display unit 50 includes light guide prism 51, light separating and synthesizing member 53, DMD 55 as a first reflective display element, DMD 57 as a second reflective display element, DMD 59 as a third reflective display element, and light absorbing member 61.

Light emitted from lens 45 of light guide unit 40 enters light guide prism 51. The light entering light guide prism 51 is reflected inside light guide prism 51, so that the traveling direction is changed. The light is then emitted toward light separating and synthesizing member 53.

Light separating and synthesizing member 53 functions as a light separation member that separates incident white light according to a predetermined wavelength region, and as a light synthesis member that synthesizes a plurality of light beams separated into predetermined wavelength regions. Light separating and synthesizing member 53 includes, for example, first prism 91, second prism 93, and third prism 95. First prism 91, second prism 93, and third prism 95 are integrated.

White light incident from light guide prism 51 enters first surface 91a of first prism 91. First prism 91 has, for example, a triangular prism shape, and has first surface 91a on which white light is incident. Further, first prism 91 has: second surface 91b which is connected to one side 91aa of first surface 91a, faces DMD 55, and extends parallel to DMD 55; and third surface 91c which is connected to one side 91bb of second surface 91b facing side 91aa and is in contact with second prism 93. First surface 91*a*, second surface 91*b*, and third surface 91*c* each have a rectangular shape.

Third surface 91*c* of first prism 91 is provided with a thin film such as a dielectric multilayer film, and functions as a dichroic mirror. Therefore, white light entering first prism 91 is separated into light beams having, for example, a red wavelength region, a green wavelength region, and a blue wavelength region, on the inner surface of first prism 91.

The wavelength region of red light as first light ranges, for example, from 600 nm to 730 nm inclusive. The wavelength region of green light as second light ranges, for example, from 515 nm to 599 nm inclusive. The wavelength region of blue light as third light ranges, for example, from 420 nm to 514 nm inclusive.

Second prism 93 has, for example, a triangular prism shape, and is adjacent to first prism 91 and third prism 95. Second prism 93 has fourth surface 93*a* in contact with third surface 91*c* of first prism 91. Further, second prism 93 has: fifth surface 93*b* which is connected to one side 93*aa* of fourth surface 93*a*, faces DMD 57, and extends parallel to DMD 57; and sixth surface 93*c* which is in contact with the third prism and is connected to side 93*ab* facing side 93*aa* of fourth surface 93*a*. Fourth surface 93*a*, fifth surface 93*b*, and sixth surface 93*c* each have a rectangular shape.

Third prism 95 has, for example, a trapezoidal prism shape and is adjacent to second prism 93. Third prism 95 has: seventh surface 95*a* in contact with sixth surface 93*c* of second prism 93; and eighth surface 95*b* facing seventh surface 95*a* and DMD 59 and extending parallel to DMD 59.

The red light separated by first prism 91 passes through second prism 93, is emitted from light separating and synthesizing member 53, and enters DMD 57. The similarly separated blue light passes through second prism 93 and third prism 95, is emitted from light separating and synthesizing member 53, and enters DMD 59. The similarly separated green light is totally reflected by first surface 91*a*, then emitted from light separating and synthesizing member 53, and enters DMD 55.

Figure 6:
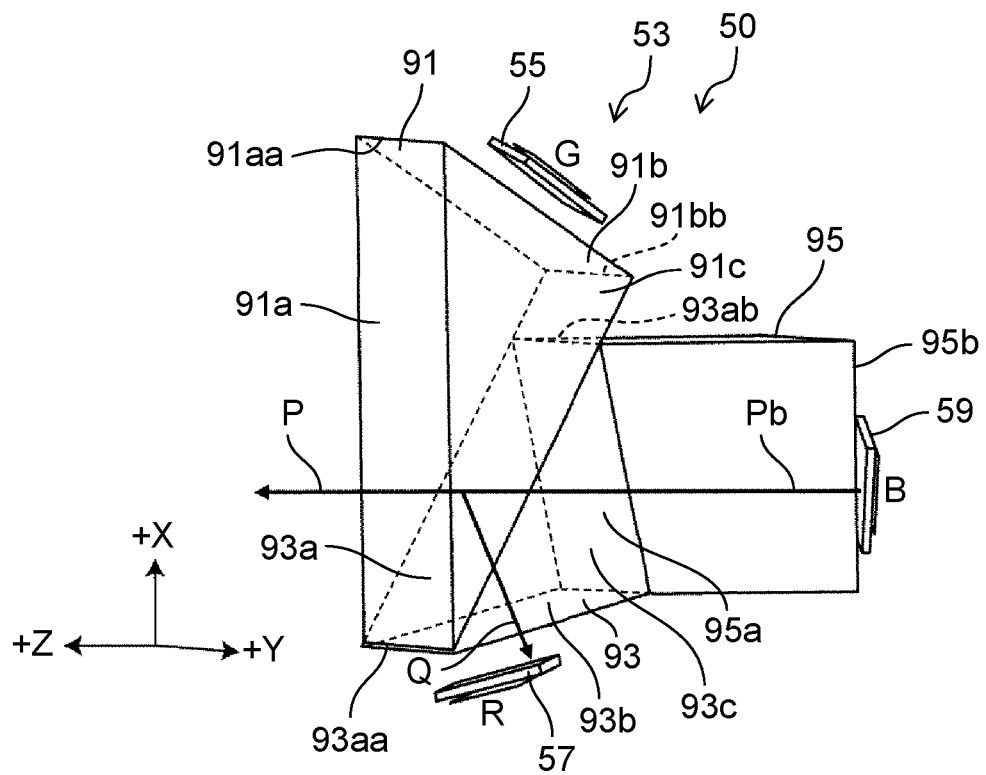
FIG. 6 is a perspective view of the light separating and synthesizing member used in the display device according to the exemplary embodiment.

Next, FIGS. 5 and 6 are referred to. FIG. 6 is a perspective view of light separating and synthesizing member 53 used in display unit 50 in the exemplary embodiment, and shows an optical path of blue image light Pb reflected by DMD 59. Note that FIG. 6 does not illustrate light absorbing member 61 for easy understanding of the optical path.

Blue image light Pb reflected and generated by DMD 59 passes through third prism 95 and second prism 93 and enters first prism 91. Blue image light Pb passing through third surface 91*c* of first prism 91 is synthesized with green image light Pg and red image light Pr, whereby image light P is generated. Generated image light P is emitted from first prism 91 toward projection lens unit 80. However, a part of blue image light Pb is reflected by third surface 91*c* of first prism 91 and converted into stray light Q. Stray light Q passes through second prism 93, and travels toward a part of an area of DMD 57. Blue image light Pb directed toward DMD 57 is about a few percent of blue image light Pb generated by DMD 59.

Figure 7:
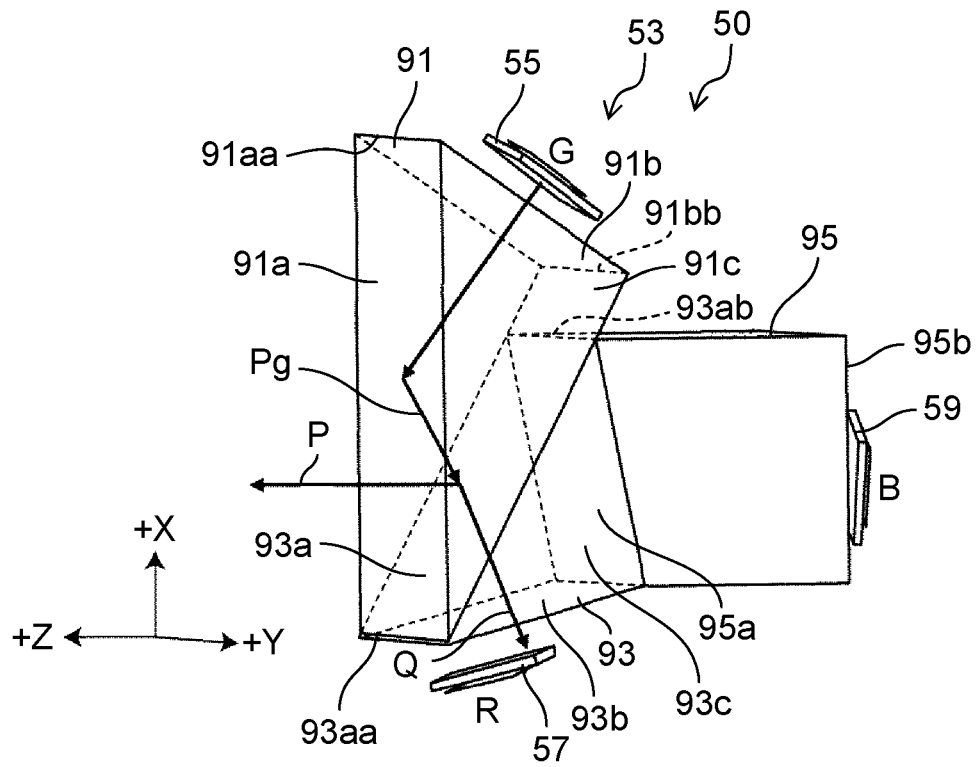
FIG. 7 is a perspective view of the light separating and synthesizing member used in the display device according to the exemplary embodiment.

Next, FIGS. 5 and 7 are referred to. FIG. 7 is a perspective view of light separating and synthesizing member 53 used in display unit 50 in the exemplary embodiment, and shows an optical path of green image light Pg reflected by DMD 55. Note that FIG. 7 does not illustrate light absorbing member 61 for easy understanding of the optical path.

Green image light Pg reflected and generated by DMD 55 is totally reflected by first surface 91*a* of first prism 91, and is reflected by third surface 91*c*. Green image light Pg passing through third surface 91*c* is synthesized with blue image light Pb and red image light Pr, whereby image light P (synthesized light) is generated. Generated image light P is emitted from first prism 91. However, a part of green image light Pg passes through third surface 91*c* of first prism 91 and is converted into stray light Q. Stray light Q passes through second prism 93, and travels toward a part of an area of DMD 57. Green image light Pg directed toward DMD 57 is about a few percent of green image light Pg generated by DMD 55.

Figure 8:
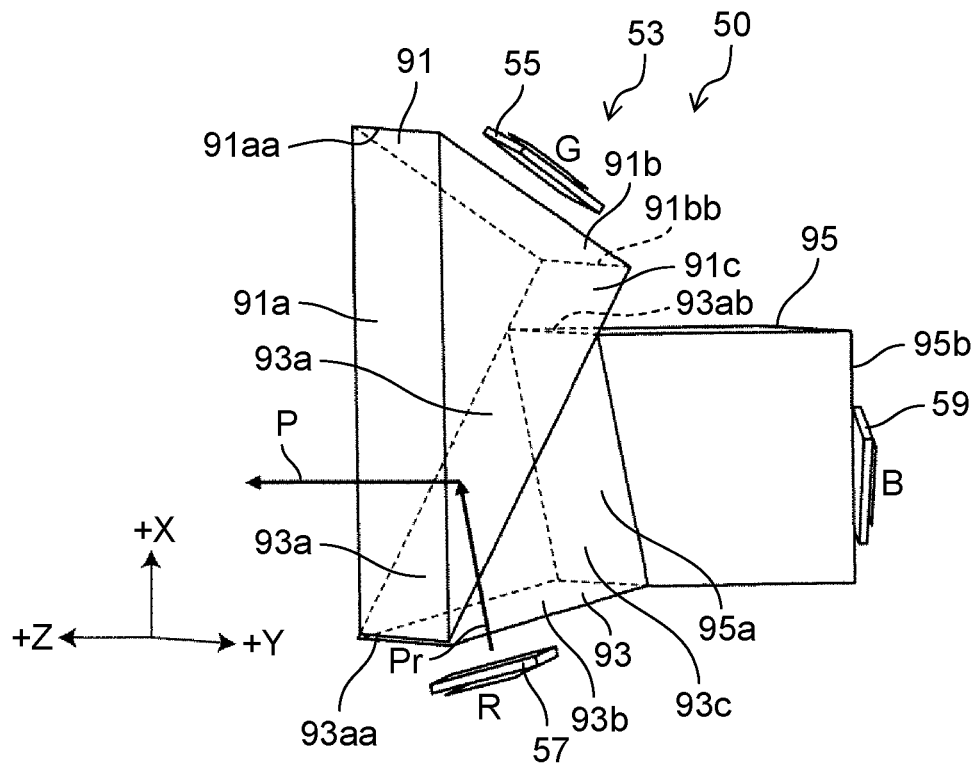
FIG. 8 is a perspective view of the light separating and synthesizing member used in the display device according to the exemplary embodiment.

Next, FIGS. 5 and 8 are referred to. FIG. 8 is a perspective view of light separating and synthesizing member 53 used in display unit 50 in the exemplary embodiment, and shows an optical path of red image light Pr reflected by DMD 57. Note that FIG. 8 does not illustrate light absorbing member 61 for easy understanding of the optical path.

Red image light Pr reflected and generated by DMD 57 passes through second prism 93, is refracted on first surface 91*a* of first prism 91, and directed toward first surface 91*a*. Red image light Pr refracted on third surface 91*c* is synthesized with blue image light Pb and green image light Pg, whereby image light P is generated. Generated image light P is emitted from first prism 91.

As described above, stray light Q originated from blue image light Pb and green image light Pg is directed to DMD 57. The irradiation region irradiated with stray light Q is an area of DMD 57 closer to third prism 95.

Next, the configurations of DMDs 55, 57, and 59 will be described with reference to FIG. 9. DMDs 55, 57, and 59 all have the same structure, so that DMD 57 will be described as an example. DMD 57 includes case 101, optical modulator 103, cover 105, and seal 107.

Case 101 has opening 101*a*, is hollow inside, and houses optical modulator 103. Opening 101*a* is closed by cover 105. Seal 107 seals between an inner edge of opening 101*a* and cover 105. Cover 105 is made of a colorless and transparent member, for example, glass or resin. Case 101 is non-metallic. For example, case 101 is made of ceramic. Seal 107 is made of resin, for example.

Optical modulator 103 has a plurality of micromirrors (not shown) arranged in a matrix. Optical modulator 103 rotates each mirror according to a control signal from controller 70 to modulate the incident light and generate image light.

The red light separated from the white light in first prism 91 enters DMD 57 which is a reflective display element. Similarly, the green light separated from the white light enters DMD 55, and the blue light separated from the white light enters DMD 59. DMDs 55, 57, and 59 are communicably connected to controller 70. Optical modulator 103 modulates the incident light by the control signal from controller 70, and reflects each incident light as green image light Pg, red image light Pr, and blue image light Pb. Image lights Pg, Pr, and Pb of respective colors are synthesized again on third surface 91*c* of first prism 91 to generate image light P, and generated image light P enters projection lens unit 80. Light emitted from projection lens unit 80 is magnified and projected onto a screen as image light P.

Meanwhile, stray light Q occurs which is formed by image lights Pg and Pb that have been modulated into image signals by DMDs 55 and 59 and are not synthesized again on third surface 91*c* of first prism 91. Stray light Q travels toward a part of the area of DMD 57. When seal 107 is irradiated with stray light Q, energy of stray light Q is converted into heat, so that seal 107 is melted to form a hole. This hole allows communication between the inside and the outside of case 101, so that the airtightness inside case 101 is lost. As a result, the rotation of each micromirror in DMD 57 is delayed, and generated red image light Pr may cause a defective dot and the like, resulting in deterioration of image quality.

Light absorbing member 61 is disposed between DMD 57 and second prism 93 so as to be parallel to DMD 57 and fifth surface 93b of second prism 93. A part of stray light Q generated in first prism 91 or second prism 93 enters light absorbing member 61 and is converted into heat by light absorbing member 61. Light absorbing member 61 is supported while being not in contact with DMD 57, and therefore, the heat energy converted from light by light absorbing member 61 is not directly transmitted to DMD 57. Further, remaining stray light Q enters optical modulator 103 of DMD 57 and is reflected by the micromirrors.

Figure 9:
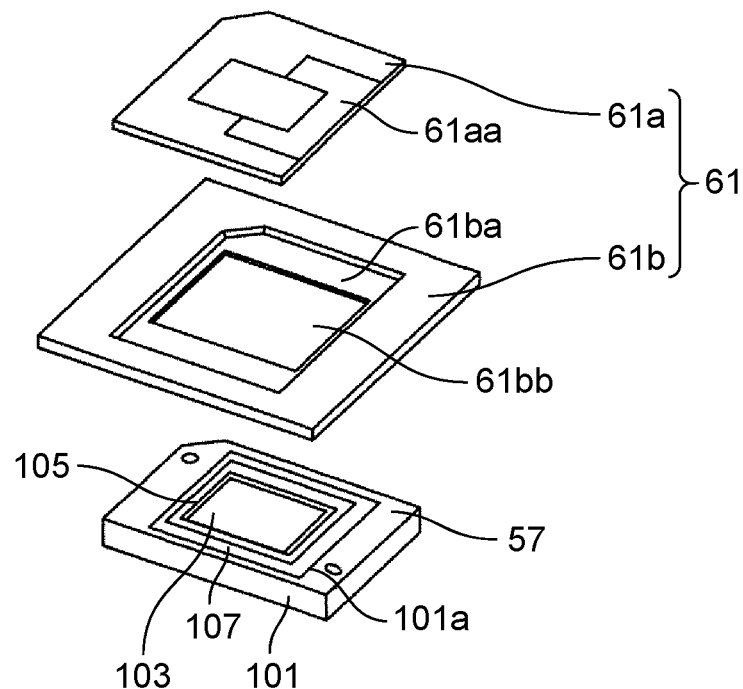
FIG. 9 is a perspective view of a light absorbing member and a DMD used in the display device according to the exemplary embodiment.
Figure 10:
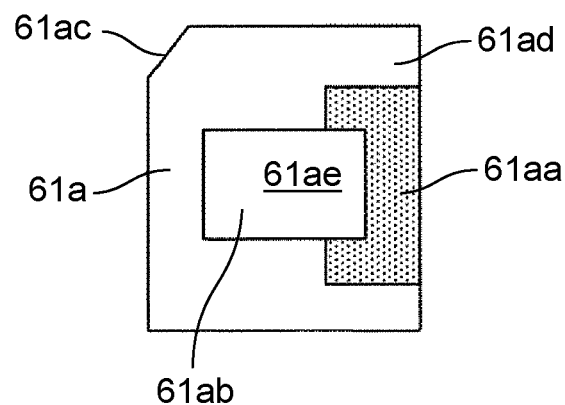
FIG. 10 is a plan view of the light absorbing member used in the display device according to the exemplary embodiment.

As shown in FIGS. 9 and 10, light absorbing member 61 has mask member 61a and heat exhausting member 61b. Light absorbing member 61 covers a part of DMD 57 except for optical modulator 103. Mask member 61a includes, for example, substantially rectangular plate 61ad having positioning part 61ac formed by cutting one corner. A through hole is formed in the central portion of mask member 61a as light transmission region 61ab, and the opening of the through hole is covered with antireflection film 61ae. Antireflection film 61ae is formed of, for example, silicon dioxide. Light transmission region 61ab is formed to have a size corresponding to a display region of optical modulator 103 of DMD 57. The separated red light and red image light Pr pass through light transmission region 61ab.

Mask member 61a is, for example, colorless and transparent glass, and has film 61aa formed on plate 61ad in an irradiation region irradiated with stray light Q. That is, mask member 61a of light absorbing member 61 includes plate 61ad and film 61aa on plate 61ad. Film 61aa formed on plate 61ad is a metal film or a dielectric film. The metal film is, for example, a chromium multilayer film, but other metals may be used. The metal multilayer film is formed by dividing a thin film into multiple layers with, for example, deposition or sputtering. The film thickness of the metal multilayer film is about 300 μm. The dielectric film is, for example, a silicon-based film. The thermal conductivity of the glass used as mask member 61a is 1.3 W/m·K or more, and for example, quartz glass or sapphire glass is used as mask member 61a. Film 61aa formed in the irradiation region has, for example, a maximum transmittance of 20% or less in a wavelength region of light ranging from 420 nm to 630 nm inclusive.

Heat exhausting member 61b has a function of absorbing and exhausting heat converted from light absorbed by mask member 61a irradiated with stray light Q. Heat exhausting member 61b is in contact with mask member 61a and is disposed so as to enable conduction of heat from mask member 61a to heat exhausting member 61b. Heat exhausting member 61b is a metal plate having excellent heat conduction, and is made of, for example, copper. Note that heat exhausting member 61b may be in direct contact with plate 61ad of mask member 61a. With this configuration, heat can be further conducted.

Heat exhausting member 61b has recess 61ba for accommodating mask member 61a and rectangular opening 61bb formed in the center of recess 61ba. Opening 61bb is formed larger than light transmission region 61ab of mask member 61a, and the separated red light and red image light Pr pass through opening 61bb.

The operation of light absorbing member 61 will be described with reference to FIG. 5. Green image light Pg generated by modulating the separated green light by DMD 55 enters again first prism 91 and is totally reflected by first surface 91a. A part of totally reflected green image light Pg passes through third surface 91c having a function of transmitting blue light and red light. Transmitted green image light Pg becomes stray light Q, and is emitted from second prism 93 toward light absorbing member 61.

In addition, blue image light Pb generated by modulating the separated blue light by DMD 59 enters again third prism 95 and second prism 93. A part of blue image light Pb is reflected by third surface 91c, and enters again second prism 93 as stray light Q. Stray light Q originated from blue image light Pb is also emitted from second prism 93 toward light absorbing member 61.

As described above, film 61aa of light absorbing member 61 is disposed in the region irradiated with stray light Q. Stray light Q entering film 61aa of light absorbing member 61 is converted into heat energy and radiated into the air from light absorbing member 61 and heat exhausting member 61b. Film 61aa is, for example, disposed so as to overlap seal 107 of DMD 57 in a plan view, which can suppress seal 107 from being irradiated with stray light Q. Thus, it is possible to prevent loss of airtightness inside DMD 57 due to seal 107 being damaged by heat.

1-2. Effects and Others

As described above, display device 3 according to the present exemplary embodiment includes light source unit 10 that emits light, and DMDs 57 and 55. Each of DMD 57 and DMD 55 includes optical modulator 103 that modulates and reflects incident light. Display device 3 further includes light separating and synthesizing member 53 that separates light emitted from light source unit 10 into red light and green light having different wavelength regions. Light separating and synthesizing member 53 emits red light toward DMD 57, emits green light toward DMD 55, and synthesizes red image light Pr reflected by DMD 57 and green image light Pg reflected by DMD 55. Display device 3 further includes light absorbing member 61 that covers a part of DMD 57 except for optical modulator 103. Light absorbing member 61 absorbs a part of green image light Pg reflected by DMD 55 and directed toward DMD 57.

In the present exemplary embodiment, display device 3 includes light absorbing member 61, whereby stray light Q directed to DMD 57 can be reduced. Further, light absorbing member 61 exhausts heat generated by absorbing stray light Q into the air. With this configuration, it is possible to suppress a decrease in use efficiency of light emitted from light source unit 10 and suppress a temperature rise of DMD 57 due to stray light. As a result, display device 3 and projection device 1 that suppress temperature rise of DMD 57 can be provided.

Other Exemplary Embodiments

The above exemplary embodiment has been described above as an example of the technique disclosed in the present application. However, the technique in the present disclosure is not limited thereto, and can also be applied to exemplary embodiments subjected to modification, substitution, addition, omission, and the like. In addition, new exemplary embodiments can be made by combining constituents described in the above exemplary embodiment.

In the exemplary embodiment, mask member 61a and heat exhausting member 61b are separate members, but the present disclosure is not limited thereto. In FIG. 5, heat exhausting member 61b may have a function of absorbing light without using mask member 61*a*, or mask member 61*a* and heat exhausting member 61*b* may be integrated.

Figure 11:
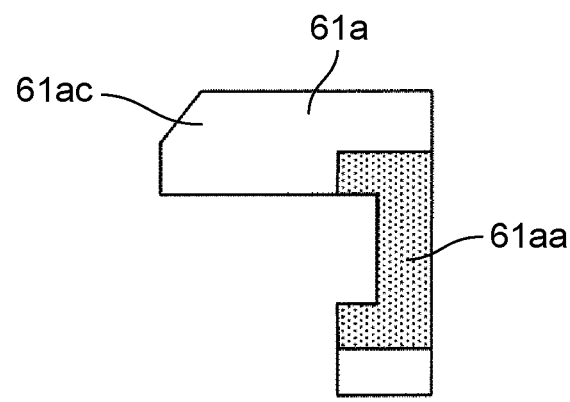
FIG. 11 is a plan view of a light absorbing member used in a display device according to a modification.
Figure 12:
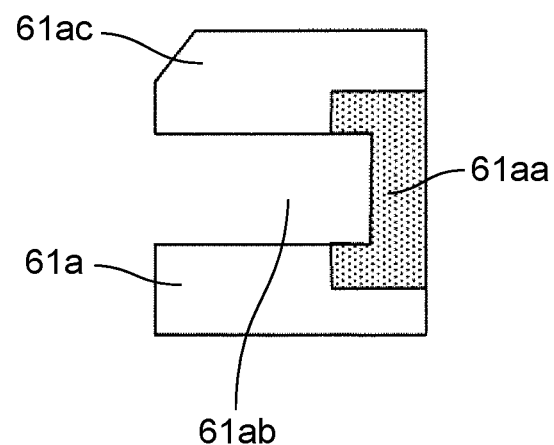
FIG. 12 is a plan view of a light absorbing member used in a display device according to a modification.

In the exemplary embodiment, mask member 61*a* is a substantially rectangular plate, but is not limited thereto. Mask member 61*a* may have an L-shape as shown in FIG. 11, or may have a U-shape surrounding light transmission region 61*ab* as shown in FIG. 12. Thus, the manufacturing cost of light absorbing member 61 can be reduced.

In the exemplary embodiment, heat exhausting member 61*b* dissipates heat into the air for exhausting heat, but it is not limited thereto. A heat pipe may be brought into contact with heat exhausting member 61*b*, a pipe through which cooling water flows may be brought into contact with heat exhausting member 61*b*, or air from a fan may be applied to heat exhausting member 61*b* to improve heat exhaust efficiency.

In the exemplary embodiment, light source unit 10 generates white light from the blue laser generated by blue semiconductor laser 11*a*, but the present disclosure is not limited thereto. White light may be generated by synthesizing light beams of respective colors from a red semiconductor laser, a blue semiconductor laser, and a green semiconductor laser, or a light source other than the laser such as a lamp may be used.

The exemplary embodiment has been described herein as an example of the technique in the present disclosure. The accompanying drawings and the detailed description have been provided for this purpose. Accordingly, the components described in the accompanying drawings and the detailed description may not only include components that are essential for solving the problems, but may also include components that are not essential for solving the problems in order to illustrate the technique. It should not be therefore determined that the unessential components in the accompanying drawings and the detailed description are essential only based on the fact that these components are included in the drawings and the description.

The above exemplary embodiment is provided to exemplify the technique according to the present disclosure, and thus various changes, replacements, additions, omissions, and the like can be made within the scope of the claims and equivalents thereof.

SUMMARY OF EXEMPLARY EMBODIMENT (1) The display device according to the present disclosure includes: a light source unit that emits light; and a first reflective display element and a second reflective display element each including an optical modulator that modulates and reflects incident light. The display device further includes a light separating and synthesizing member that separates the light emitted from the light source unit into first light and second light having different wavelength regions, emits the first light toward the first reflective display element, emits the second light toward the second reflective display element, and synthesizes the first light that has been reflected and modulated by the first reflective display element and the second light that has been reflected and modulated by the second reflective display element. The display device further includes a light absorbing member that covers a part of the first reflective display element except for the optical modulator, and absorbs a part of the modulated second light reflected by the second reflective display element and directed toward the first reflective display element.

As described above, the light absorbing member covers a part of the first reflective display element except for the optical modulator, and absorbs a part of the modulated second light reflected by the second reflective display element and directed toward the first reflective display element. Therefore, it is possible to suppress stray light, which is generated by light not synthesized by the light separating and synthesizing member, from entering the first reflective display element. This makes it possible to provide a display device that suppresses a temperature rise of the display element.

(2) The display device according to (1) further includes a third reflective display element including an optical modulator that modulates and reflects incident light. The light separating and synthesizing member separates the light emitted from the light source unit into the first light, the second light, and third light having different wavelength regions, emits the third light toward the third reflective display element, and synthesizes the modulated first light, the modulated second light, and the third light which has been reflected and modulated by the third reflective display element. The light absorbing member absorbs a part of the modulated third light reflected by the third reflective display element and directed toward the first reflective display element.

(3) The display device according to (2) further includes a heat exhausting member that exhausts heat generated by the absorbed second light and third light. Due to the heat exhausting member being provided, heat generated by the stray light absorbed by the light absorbing member can be efficiently exhausted.

(4) In the display device according to any one of (1) to (3), the light absorbing member includes a mask member having a film formed on a plate. The film formed on the mask member has a maximum transmittance of 20% or less in a wavelength region of light ranging from 420 nm to 630 nm inclusive.

(5) In the display device according to (4), the film is a metal film. Since the film of the light absorbing member is a metal film, the light absorbing member has excellent heat resistance and durability, and also has excellent thermal conductivity.

(6) In the display device according to (4), the film is a dielectric film.

(7) In the display device according to (2) or (3), the light separating and synthesizing member includes a plurality of integrated prisms.

(8) In the display device according to (7), the prisms include a first prism that has a triangular prism shape and has a first surface perpendicular to an emission direction of the synthesized light, a second prism that has a triangular prism shape and is adjacent to the first prism, and a third prism that has a trapezoidal prism shape and is adjacent to the second prism.

(9) In the display device according to (8), the first prism has: a second surface connected to the first surface and extending parallel to the second reflective display element; and a third surface connected to the first surface and the second surface and in contact with the second prism. The second prism has: a fourth surface in contact with the third surface of the first prism; a fifth surface connected to the fourth surface and extending parallel to the first reflective display element; and a sixth surface connected to the fourth surface and the fifth surface and in contact with the third prism. The third prism includes: a seventh surface in contact with the sixth surface of the second prism; and an eighth surface facing the seventh surface and extending parallel to the third reflective display element.

(10) In the display device according to any one of (1) to (9), the light absorbing member has a U-shape or an L-shape. With this configuration, the manufacturing cost of light absorbing member 61 can be reduced.

(11) A projection device according to the present disclosure includes the display device according to any one of (1) to (10), and a projection lens unit that projects image light emitted from the display device.

The present disclosure is applicable to a light source device or a projection-type image display device such as a projector.

What is claimed is:

1. A display device comprising:
   a light source unit that emits light;
   a first display element having a first optical modulator that modulates and reflects incident light;
   a second display element having a second optical modulator that modulates and reflects incident light;
   a light separating and synthesizing member that (i) separates the light emitted from the light source unit into first light and second light having different wavelength regions, (ii) emits the first light toward the first display element, (iii) emits the second light toward the second display element, and (iv) synthesizes the first light that has been reflected and modulated by the first display element and the second light that has been reflected and modulated by the second display element; and
   a light absorbing member that covers a part of the first display element except for the first optical modulator, wherein the light absorbing member absorbs a part of the second light that has been modulated and reflected by the second display element and is directed toward the first display element, wherein
   the light absorbing member includes a mask member,
   the mask member includes a plate and a film on the plate, and
   the film of the mask member has a light transmittance of 20% or less in a wavelength region of light ranging from 420 nm to 630 nm inclusive.

2. The display device according to claim 1, further comprising a third display element having a third optical modulator that modulates and reflects incident light,
   wherein
   the light separating and synthesizing member (i) separates the light emitted from the light source unit into the first light, the second light, and third light that have different wavelength regions, (ii) emits the third light toward the third display element, and (iii) synthesizes the first light that has been modulated, the second light that has been modulated, and the third light that has been reflected and modulated by the third display element, to generate synthesized light, and
   the light absorbing member further absorbs a part of the third light that has been modulated and reflected by the third display element and is directed toward the first display element.

3. The display device according to claim 2, wherein
   the light absorbing member includes a heat exhausting member, and
   the heat exhausting member exhausts heat that is generated by the part of the second light and the part of the third light.

4. The display device according to claim 1, wherein the film is a metal film.

5. The display device according to claim 1, wherein the film is a dielectric film.

6. The display device according to claim 2, wherein the light separating and synthesizing member includes a plurality of prisms that is integrated.

7. The display device according to claim 6, wherein the plurality of prisms includes:
   a first prism that has a triangular prism shape and has a first surface perpendicular to an emission direction of the synthesized light;
   a second prism that has a triangular prism shape and is adjacent to the first prism; and
   a third prism that has a trapezoidal prism shape and is adjacent to the second prism.

8. The display device according to claim 7, wherein
   the first prism further has:
      a second surface connected to the first surface and extending parallel to the second display element, and
      a third surface connected to the first surface and the second surface, the third surface being in contact with the second prism,
   the second prism has:
      a fourth surface in contact with the third surface of the first prism,
      a fifth surface connected to the fourth surface and extending parallel to the first display element, and
      a sixth surface connected to the fourth surface and the fifth surface, the sixth surface being in contact with the third prism, and
   the third prism has:
      a seventh surface in contact with the sixth surface of the second prism, and
      an eighth surface facing the seventh surface and extending parallel to the third display element.

9. The display device according to claim 1, wherein the light absorbing member has a U shape.

10. The display device according to claim 1, wherein the light absorbing member has an L shape.

11. The display device according to claim 1, wherein the light source unit emits white light.

12. The display device according to claim 2, wherein each of the first, second, and third display elements includes a digital micromirror device.

13. The display device according to claim 2, wherein
   the first light has a wavelength region including a wavelength of red light,
   the second light has a wavelength region including a wavelength of green light, and
   the third light has a wavelength region including a wavelength of blue light.

14. The display device according to claim 3, wherein the heat exhausting member is made of copper.

15. The display device according to claim 1, wherein the plate is made of glass.

16. The display device according to claim 8, wherein
   the light separating and synthesizing member is configured such that the part of the second light that has been modulated passes through the third surface and the second prism, to be directed to the first display element, and
   the light separating and synthesizing member is further configured such that the part of the third light that has been modulated is reflected by the third surface, to pass through the second prism, and to be directed to the first display element.

17. A projection device comprising:
    the display device according to claim 1; and a projection lens unit that projects image light emitted from the display device.

* * * * *